Aug. 2, 1927.
R. G. MOORE
1,637,530
AUTOMOBILE HOOD CLAMP
Filed Oct. 28, 1924     3 Sheets-Sheet 1
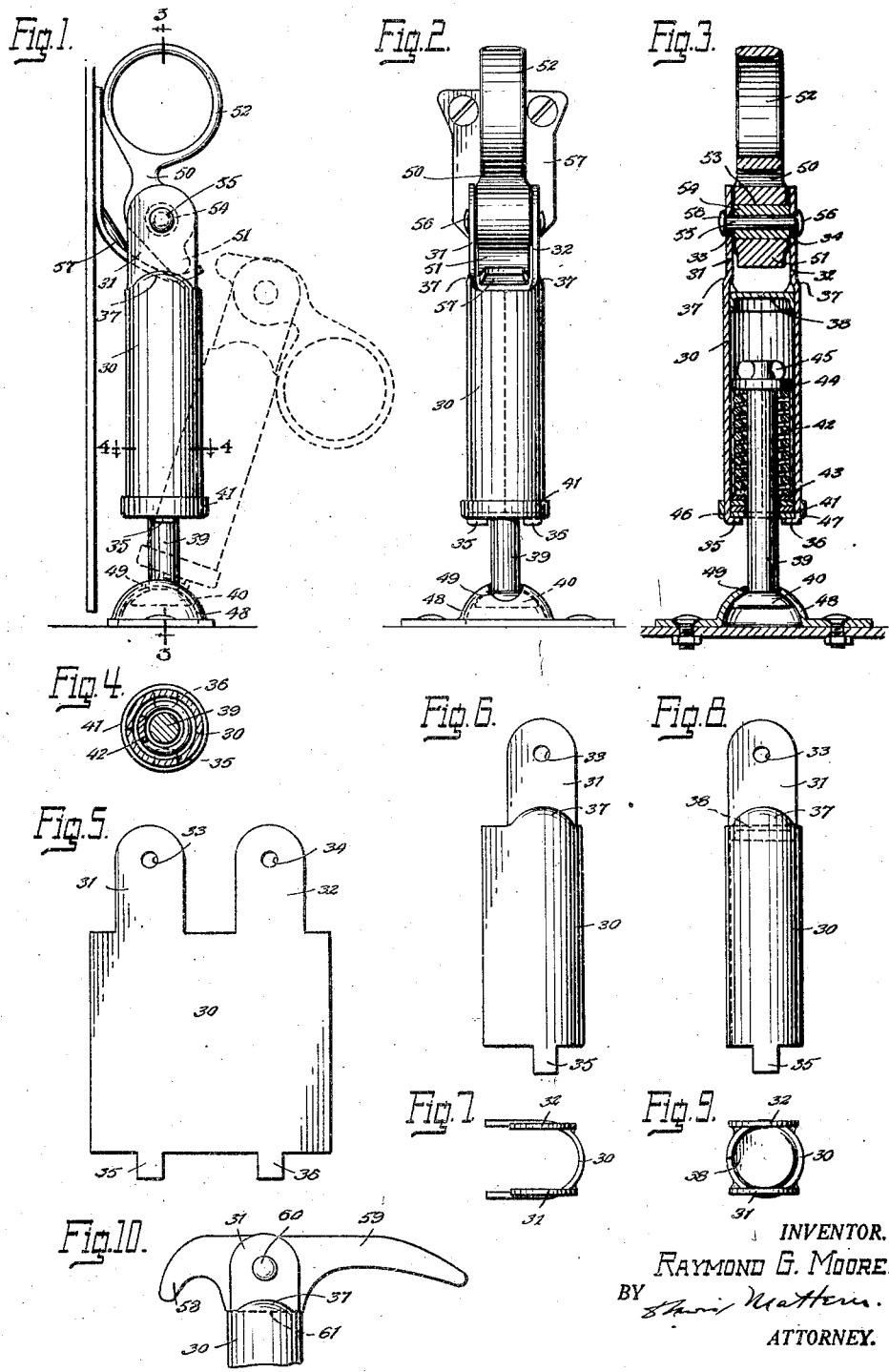
INVENTOR.
RAYMOND G. MOORE.
BY
ATTORNEY.

Aug. 2, 1927.
R. G. MOORE
1,637,530
AUTOMOBILE HOOD CLAMP
Filed Oct. 28, 1924   3 Sheets-Sheet 2
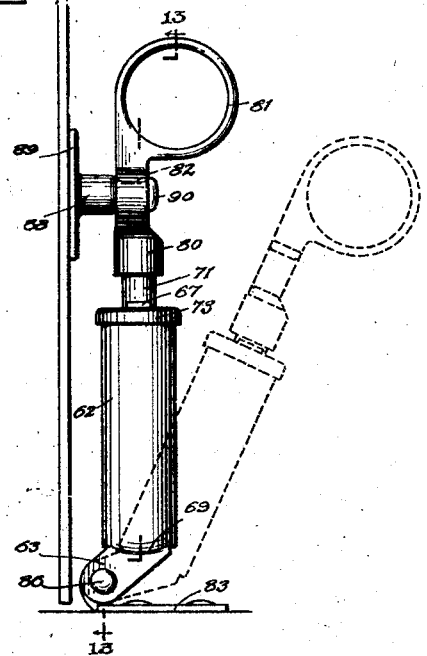
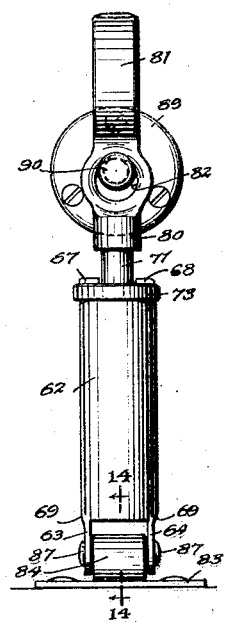
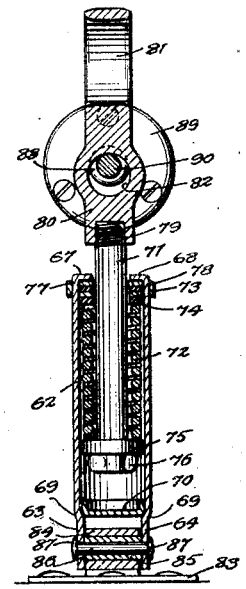
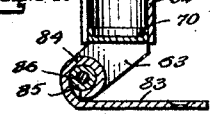
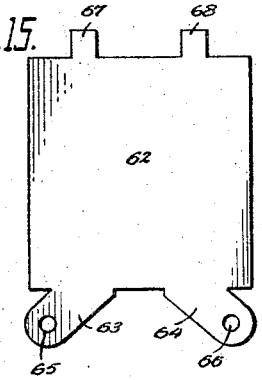
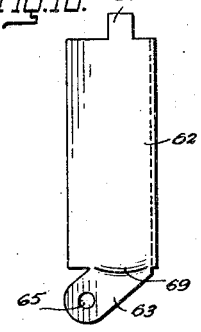
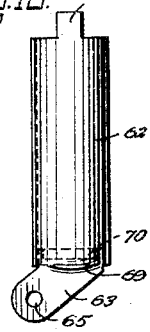
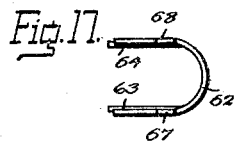
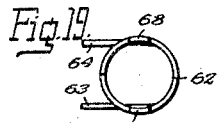
INVENTOR.
RAYMOND G. MOORE.
BY
ATTORNEY.

Aug. 2, 1927.
R. G. MOORE
1,637,530
AUTOMOBILE HOOD CLAMP
Filed Oct. 28, 1924   3 Sheets-Sheet 3
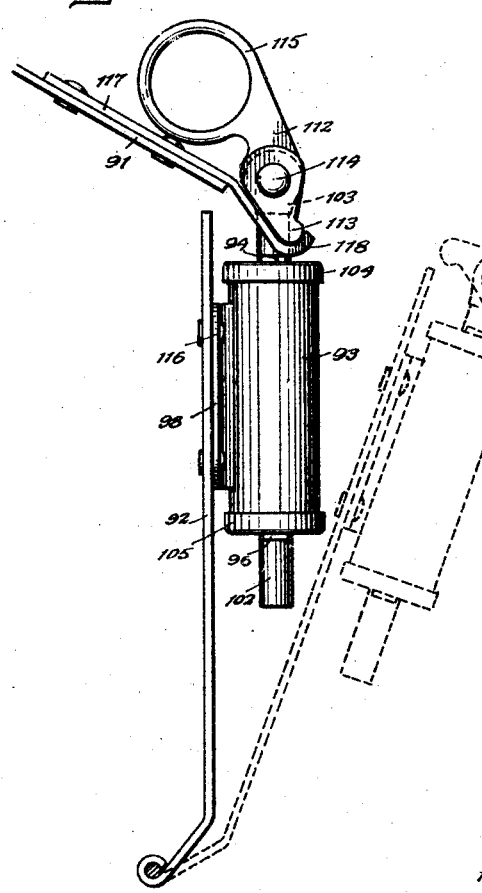
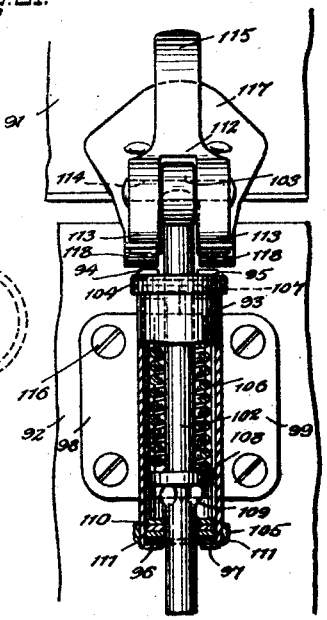
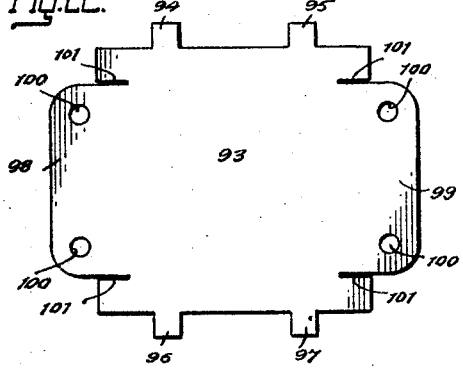
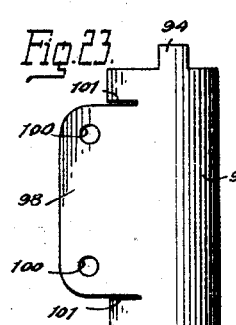
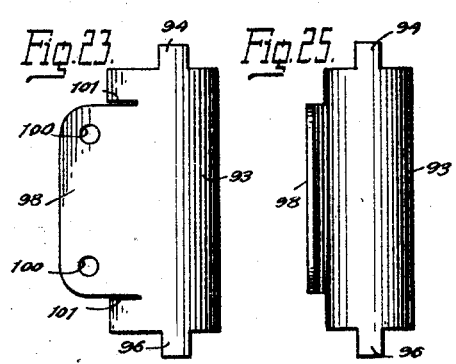
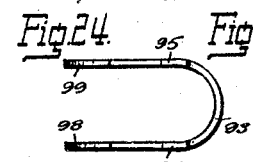
INVENTOR.
RAYMOND G. MOORE.
BY
ATTORNEY.

Patented Aug. 2, 1927.

1,637,530

UNITED STATES PATENT OFFICE.

RAYMOND G. MOORE, OF BRIDGEPORT, CONNECTICUT, ASSIGNOR TO THE BASSICK COMPANY, OF BRIDGEPORT, CONNECTICUT, A CORPORATION OF CONNECTICUT.

AUTOMOBILE HOOD CLAMP.

Application filed October 28, 1924. Serial No. 746,294.

The present invention relates to improvements in automobile hood clamps, and particularly hood clamps adapted for heavy usage, as upon trucks or busses, a principal object of the invention being to provide a clamp of this character, in which the barrel is formed of sheet metal pressed to shape.

In accordance with the present embodiment of the invention, it is proposed to provide a sheet metal barrel having integral attachment portions for securing the same in relation to a cooperating part of the clamp structure, and whereby a simple and economical construction of relatively great strength is provided. To this end it is proposed in certain embodiments of the invention to provide a sheet metal barrel having integral ears or extensions extending from an end thereof, and between which an end member is pivotally connected, the construction being such as to provide a rigid support for the ears and at the same time permit free pivotal movement of the end member.

Other objects consist in providing a device of this character, which may be conveniently and economically manufactured by efficient fabricating processes, and in which the barrel is produced by an improved method which enables it to be constructed from sheet metal and assembled with the other parts of the clamp, so that the whole structure is of relatively great strength and durability.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a side elevation of a hood clamp, according to one embodiment of the invention, and showing in dotted lines the inoperative or unclamped position thereof;

Fig. 2 is a front elevation of the same;

Fig. 3 is a vertical sectional view, taken along the line 3—3 of Fig. 1;

Fig. 4 is a horizontal sectional view taken along the line 4—4 of Fig. 1;

Fig. 5 is a plan view of the barrel forming blank, as it is cut from sheet metal;

Fig. 6 is a side elevation of the blank after the first forming operation, the same being bent to U-shape in cross-section;

Fig. 7 is a top view of the same;

Fig. 8 is a side elevation of the blank after the final forming operation, the same being bent to tubular form;

Fig. 9 is a top view of the same;

Fig. 10 is a side elevation of the top end of a hood clamp, according to a modification of the invention;

Fig. 11 is a side elevation of a hood clamp, according to another modification of the invention, and showing in dotted lines the inoperative or unclamped position thereof;

Fig. 12 is a front elevation of the same;

Fig. 13 is a vertical sectional view, taken along the line 13—13 of Fig. 11;

Fig. 14 is a vertical sectional view of the base plate, taken along the line 14—14 of Fig. 12;

Fig. 15 is a plan view of the barrel forming blank;

Fig. 16 is a side elevation of the blank after the first forming operation, the same being bent to U-shape in cross-section;

Fig. 17 is a top view of the same;

Fig. 18 is a side elevation of the blank after the final forming operation, the same being bent to tubular form;

Fig. 19 is a top view of the same;

Fig. 20 is a side elevation of a hood clamp, according to a further modification of the invention, and showing in dotted lines the inoperative or unclamped position thereof;

Fig. 21 is a front elevation of the same, partly in section;

Fig. 22 is a plan view of the barrel forming blank;

Fig. 23 is a side elevation of the blank, after the first forming operation, the same being bent to U-shape in cross-section;

Fig. 24 is a top view of the same;

Fig. 25 is a side elevation of the blank, after the final forming operation, the same being bent to tubular form; and Fig. 26 is a top view of the same.

Similar reference characters indicate corresponding parts throughout the several figures of the drawings.

Referring to the drawings, and more particularly to Figs. 1 to 9 thereof, in which one embodiment of the invention is illustrated, the hood clamp comprises a sheet metal cylindrical barrel 30 formed as shown in Figs. 5 to 9 from a flat piece of sheet metal, as cold rolled steel, blanked out to the proper shape to provide upwardly extending ears 31 and 32 along the upper edge provided with pivot-pin-receiving apertures 33 and 34 respectively, and projecting lugs 35 and 36 along the lower edge. According to the present method the blank is first pressed to U-shape in cross-section, as indicated in Figs. 6 and 7, and by suitable dies shoulders 37 are pressed out at the base of the ears 31 and 32, which latter are flat and are brought by the U-ing operation into opposed and parallel relation to each other with the apertures 33 and 34 aligned.

A flanged end closure cap 38 is now inserted in the upper end of the barrel, and the latter is pressed to cylindrical shape bringing the vertical edges together, as shown in Figs. 8 and 9, and securely fixing the position of the cap 38.

The plunger and lower end cap assembly is now fitted and secured into the barrel. The plunger 39, which is headed at its lower end, as at 40, has slidably engaged thereon the apertured and flanged lower end cap 41, a coil spring 42 being provided on the plunger between a series of wear-washers 43 engaged upon the inner side of the cap 41 and a washer 44 engaged upon the upper end of the plunger, and held thereon by pinching out the end of the plunger, as at 45. The closure cap 41 is slotted, as at 46 and 47, at diametrically opposed points adjacent the flange, and is secured to the end of the barrel by passing the lugs 35 and 36 through the slots and bending over the lugs, as clearly indicated in Fig. 3, the flange securely maintaining the cylindrical relation of the barrel at one end.

In the illustrated embodiment, the headed end of the plunger is engaged in a domed base plate 48, adapted to be screwed to the automobile frame, and provided in the domed portion with a slot 49, in which the plunger is engaged and adapted to swing forwardly, as indicated in dotted lines Fig. 1. This base plate is assembled upon the plunger prior to the other parts above described.

Between the ears 31 and 32 there is pivotally mounted a toggle lever 50, having a nose 51 at one end and a ring-shaped handle 52 at its other end. The lever is slightly narrower than the space between the ears, and is provided with a cylindrical passage 53 in which is engaged a tubular bushing 54 disposed between the ears and tightly secured by means of a pin 55 engaged in the apertures 37 and 38, and headed over at its ends, as at 56. This bushing is of corresponding width to the distance between the ears, and the assembly is such that a rigid support and connection between the ears is provided, which prevents any possibility of distorting the barrel at its upper end, and at the same time permits of free pivotal movement of the toggle lever.

In operation, the toggle lever is adapted to lockingly engage with a keeper 57 secured to the hood of the automobile, and having its curved projecting end of such width as to freely engage between the ears 31 and 32. The full lines, Fig. 1, indicate the locked or clamped position of the device in which the nose of the lever is engaged with the keeper forwardly of the vertical center line through the pivot, the handle abutting the upper vertical surface of the keeper, and the barrel being drawn upwardly against the pressure of the spring. The dotted lines indicate the unclamped position in which the handle is swung outwardly to disengage the lever from the keeper, and in which position the plunger is retracted.

In Fig. 10 there is illustrated a modified form of the device, in which an upper transverse member including a hook end 58 for engagement with a suitable keeper and a handle 59 for lifting the barrel is rigidly clamped by means of a pin 60, the flat base 61 of the member constituting a closure end for the barrel in place of the cap 38 employed in the first embodiment for this purpose.

In Figs. 11 to 19 a further modification of the invention is illustrated comprising a cylindrical barrel 62 formed as shown in Figs. 15 to 19 from a flat piece of sheet metal blanked to shape to provide downwardly and angularly extending ears 63 and 64 along the lower edge, provided with pivot-pin-receiving apertures 65 and 66, and upwardly extending lugs 67 and 68 along the upper edge. The blank is pressed to U-shape in cross-section, as shown in Figs. 16 and 17, and by suitable dies shoulders 69 are pressed out at the lower end of the barrel adjacent the ears, which latter are flat and in opposed parallel relation to each other with the apertures 65 and 66 aligned.

A flanged end closure cap 70 is now inserted in the lower end of the barrel, which is pressed to cylindrical shape bringing the vertical edges together, as shown in Figs. 18 and 19.

The plunger and end cap assembly is now fitted and secured into the barrel, this being substantially similar to the assembly shown in the first form, and consisting of the plunger 71, the spring 72, the flanged and apertured closure cap 73, the wear-washers 74, and the end spring retaining washer 75 secured by pinching the end of the plunger, as at 76. The closure cap is slotted, as at 77 and 78 and engaged over the end of the barrel with the lugs 67 and 68 projected through the slots and bent over, as indicated in Fig. 13.

The upper end of the plunger is threaded, as at 79, and is secured to the interiorly threaded socket end 80 of a handle member 81 having a ring-shaped grip portion and provided above the socket portion with a transverse aperture 82.

The barrel is adapted to be pivotally connected at its lower end to a base plate 83, having a bearing portion 84 curled about a tubular bushing 85 secured between the ears 63 and 64 by means of a pin 86 riveted over at its ends, as at 87. The bushing is of corresponding width to the distance between the ears, so that the latter are rigidly supported and connected, while the curled bearing portion is of less width, so that the barrel may be freely swung upon its pivot mounting.

The clamp, according to the present embodiment of the invention, is adapted to cooperate with a peg-like keeper 88, having its base 89 secured to the hood of the automobile, and provided with a reduced and headed end portion 90, adapted to be lockingly engaged in the aperture 82, as indicated in full lines in Fig. 11, and in Figs. 12 and 13, the spring being compressed in this position and the plunger drawn upwardly with respect to the barrel. In order to disengage the clamp the plunger is pulled upwardly slightly, by means of the handle, to disengage the headed end of the keeper from the aperture 82, and the clamp is swung forwardly to the dotted line position Fig. 11.

In Figs. 20 to 26 there is illustrated a still further modification of the invention, adapted particularly for use with hoods in which each side of the same comprises an upper hinged flap 91 and a side hinged flap 92, the clamp proper being secured upon the side flap, while the keeper is secured upon the upper flap.

According to this embodiment of the invention, the cylindrical barrel 93 is formed from flat sheet metal, blanked to shape to provide projecting lugs 94 and 95 along the top edge and lugs 96 and 97 along the bottom edge. At each end there are provided projecting flap portions 98 and 99 apertured at their corners, as at 100, for engagement of attaching screws, the upper and lower edges of the flaps being spaced from the upper and lower edges of the blank, and cut into the same, as at 101.

The blank is first pressed to U-shape in cross-section, as indicated in Figs. 23 and 24, and the same is then pressed into barrel form, the upper and lower end portions being brought together into cylindrical form, while the flap portions 98 and 99 are turned inwardly and bent outwardly in opposite directions in the same plane, as indicated in Figs. 25 and 26.

The plunger and end cap assembly is now inserted and secured. The plunger 102, which is provided at its upper end with an eyelet 103, has upper and lower apertured and flanged end caps 104 and 105 engaged thereon, the spring 106 being engaged about the plunger between wear-washers 107 bearing upon the upper cap 104 and a washer 108 secured upon the plunger by pinching the same, as at 109, wear-washers 110 being also provided at the inner side of the lower cap 105. The closure caps are slotted, as at 111 and are engaged over the ends of the barrel, the lugs at the ends of the barrel being projected through the slots and bent over to secure the caps, as clearly indicated in Fig. 21.

A forked toggle lever 112 is pivoted to the eyelet end of the plunger, and includes a forked nose portion 113 engaged at each side of the eyelet and pivoted by means of a pivot pin 114, and a ring-shaped handle portion 115.

The clamp is secured to the side hood flap by means of screws 116, and is adapted to cooperate with a keeper 117 secured to the top hood flap and provided with a projecting hooked portion 118, forked to engage at each side of the plunger beneath the forked nose ends of the toggle lever. The full lines, Fig. 20, and Fig. 21, indicate the clamped position in which the plunger is drawn upwardly with respect to the barrel and the toggle lever is engaged with the keeper with the nose ends forwardly of the vertical line through the pivot and the handle abutting the upper surface of the keeper. The clamp is disengaged by swinging the toggle lever outwardly to release it from the keeper, and permitting the side hood flap to be swung outwardly to the dotted line position, Fig. 20.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. In a clamp, a tubular barrel formed of sheet metal bent transversely into tube form about the axis of the barrel and forming a longitudinal seam, the line of bending being parallel to the axis, spaced integral extensions on said barrel at each side of the seam, and rigid means connected and forming a rigid support between said extensions adapted to maintain them rigidly with respect to each other and to secure the tubular relation of said barrel.

2. In a clamp, a tubular barrel formed of sheet metal bent transversely into tube form about the axis of the barrel, the line of bending being parallel to the axis an end cap engaged over one end of said barrel adapted to secure the tubular relation of said barrel against outward pressure at one end, integral parallel and spaced projecting means at the other end of said barrel, and means rigidly connected and providing a rigid support between said projecting means adapted to secure the tubular relation of said barrel at the other end and to maintain the parallel and spaced relation of said projecting means.

3. In a clamp, a tubular barrel formed of sheet metal bent transversely into tube form about the axis of the barrel, the line of bending being parallel to the axis, a pair of integral spaced and opposed extensions at one end of said barrel, shouldered bearing means rigidly connected between said extensions adapted to maintain the spaced and opposed relation of said extensions, and a cooperating part pivotally mounted on said bearing member.

4. In a clamp, a tubular barrel formed of sheet metal bent transversely into tube form about the axis of the barrel, the line of bending being parallel to the axis, a pair of integral spaced and opposed extensions at one end of said barrel having aligned apertures, a tubular bearing member disposed between said extensions in alignment with said apertures adapted to rigidly maintain the spaced and opposed relation of said extensions, a clamping pin engaged in said apertures and through said bearing member to rigidly support and connect said extensions with respect to said bearing member, and a cooperating part pivotally mounted on said bearing member.

5. In a clamp, a tubular barrel formed of sheet metal bent transversely into tube form about the axis of the barrel, the line of bending being parallel to the axis, a centrally apertured end cap engaged over the end of said barrel adapted to secure the tubular relation of said barrel against outward pressure, an axially disposed spring actuated plunger in said barrel extending through said aperture of said cap, a pair of integral spaced and opposed extensions at one end of said barrel having aligned apertures, a tubular bearing member disposed between said extensions in alignment with said apertures adapted to rigidly maintain the spaced and opposed relation of said extensions, a clamping pin engaged in said apertures and through said bearing member to rigidly support and connect said extensions with respect to said bearing member, and a cooperating part pivotally mounted on said bearing member.

6. In a clamp, a tubular barrel formed of sheet metal bent transversely into tube form about the axis of the barrel, the line of bending being parallel to the axis, integral extensions at one end of said barrel, a cooperating part connected to said extensions, and an end closure cap inserted in the end of said barrel adjacent said extensions forming a rigid support adapted to secure the tubular relation of said barrel against inward pressure.

7. In a clamp, a tubular barrel formed of sheet metal bent transversely into tube form about the axis of the barrel, the line of bending being parallel to the axis, integral extensions at one end of said barrel, said barrel being bulged outwardly at each side with respect to the outer surfaces of said extensions, a cooperating part connected to said extensions, and an end closure cap inserted in the end of said barrel adjacent said extensions and adapted to be retained by said bulged portions and forming a rigid support to secure the tubular relation of said barrel against inward pressure.

Signed at Bridgeport, county of Fairfield, and State of Connecticut, this 17th day of October, 1924.

RAYMOND G. MOORE.